United States Patent

Iwabuchi et al.

[11] Patent Number: 5,844,396
[45] Date of Patent: Dec. 1, 1998

[54] VOICE COIL MOTOR DRIVE UNIT FOR MAGNETIC DISK DRIVE HAVING A WAVE SHAPING UNIT INCLUDING ZENER DIODES WITH ZENER VOLTAGE SET HIGHER THAN A VOLTAGE APPLIED TO THE COIL IN POSITIONING THE MAGNETIC HEAD, AND LOWER THAN THE VOLTAGE APPLIED TO THE COIL IN MOVING THE MAGNETIC HEAD

[75] Inventors: Masanori Iwabuchi; Kazuhiko Saito, both of Sekijoumachi, Japan

[73] Assignee: NEC Corporation, Tokyo, Japan

[21] Appl. No.: 840,799

[22] Filed: Apr. 16, 1997

[30] Foreign Application Priority Data

Apr. 18, 1996 [JP] Japan .................................... 8-096640

[51] Int. Cl.⁶ ...................................................... H02P 7/00
[52] U.S. Cl. .............................. 318/778; 318/434; 361/23
[58] Field of Search .................................... 318/778, 434; 361/23–33, 91, 111, 119; 360/69, 73.01, 73.03, 73.06, 73.09, 75, 77.02, 77.11

[56] References Cited

U.S. PATENT DOCUMENTS

| 4,095,163 | 6/1978 | Montague | 323/231 |
| 4,758,920 | 7/1988 | McCartney | 361/119 |
| 4,941,063 | 7/1990 | McCartney et al. | 361/119 |
| 5,416,663 | 5/1995 | Atkins | 361/119 |
| 5,422,777 | 6/1995 | Pezzani | 361/56 |
| 5,521,768 | 5/1996 | Shrinkle et al. | 360/69 |
| 5,572,397 | 11/1996 | Smith et al. | 361/119 |
| 5,576,920 | 11/1996 | Kosuga et al. | 361/56 |
| 5,587,876 | 12/1996 | O'Brien et al. | 361/682 |

FOREIGN PATENT DOCUMENTS

| 1259747 | 10/1989 | Japan . |
| 1181165 | 12/1989 | Japan . |

*Primary Examiner*—Jonathan Wysocki
*Attorney, Agent, or Firm*—Sughrue, Mion, Zinn, Macpeak & Seas, PLLC

[57] ABSTRACT

The voice coil motor drive unit for a magnetic disk device includes a voice coil motor, a VCM driver, and a waveshaping unit. The voice coil motor has a coil and is driven in positioning and moving a magnetic head. The VCM driver supplies a driving current to the coil of the voice coil motor through a pair of power supply lines. The waveshaping unit shapes the waveform of the driving current supplied from the VCM driver to the voice coil motor into a waveform having a smooth leading edge. The waveshaping unit has a capacitor connected between the power supply lines, and a pair of Zener diodes having the same Zener characteristics and identical poles connected to two poles of the capacitor to be opposite to each other. Each of the Zener diodes has a Zener voltage which is set higher than a voltage applied to the coil in positioning the magnetic head, and lower than the voltage applied to the coil in moving the magnetic head.

5 Claims, 3 Drawing Sheets

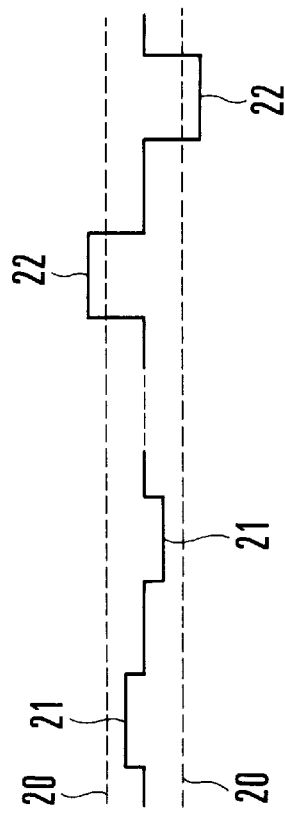
FIG. 3A VOLTAGE WAVEFORM OF VCM DRIVER 8
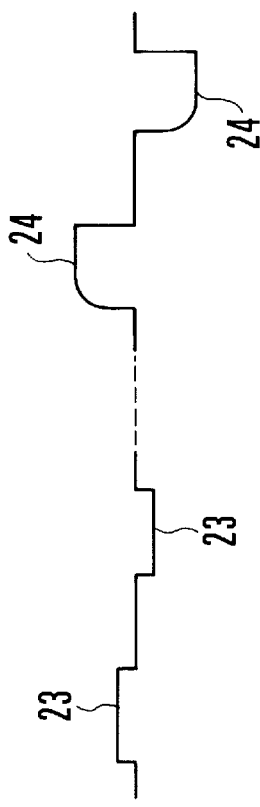
FIG. 3B CURRENT WAVEFORM OF VCM COIL 6
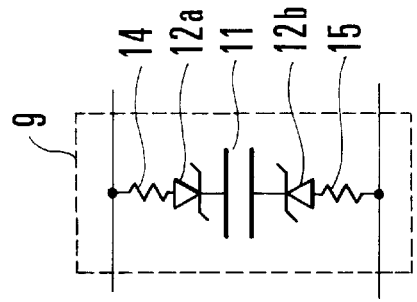
FIG. 4A
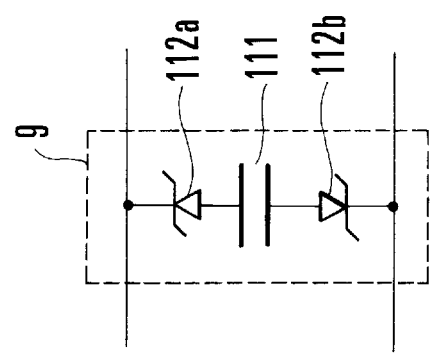
FIG. 4B

VOICE COIL MOTOR DRIVE UNIT FOR MAGNETIC DISK DRIVE HAVING A WAVE SHAPING UNIT INCLUDING ZENER DIODES WITH ZENER VOLTAGE SET HIGHER THAN A VOLTAGE APPLIED TO THE COIL IN POSITIONING THE MAGNETIC HEAD, AND LOWER THAN THE VOLTAGE APPLIED TO THE COIL IN MOVING THE MAGNETIC HEAD

BACKGROUND OF THE INVENTION

The present invention relates to a voice coil motor drive unit for supplying a driving current to a voice coil motor which drives and positions a magnetic head in a magnetic disk device.

In the voice coil motor drive unit (VCM actuator) for a conventional magnetic disk device for supplying a driving current to a voice coil motor (VCM) which drives and positions a magnetic head, the waveform of the driving current is determined by the time constant which is set by the resistance and inductance of a VCM coil, and the output voltage of a current-controlled integrated circuit (IC) serving as a VCM driver which generates a current for driving the VCM. Therefore, the waveform of the leading edge of the current is determined by the time constant which is set by the resistance and inductance of the VCM coil.

In terms of control response characteristics, the waveform of the driving current supplied to the VCM preferably has a steep leading edge in step response; in terms of vibrations during driving which greatly influence noise and the floating characteristics of the magnetic head, the waveform desirably has a moderate leading edge and a round corner portion free from any high frequency component.

To match the above two contradictory conditions, the conventional voice coil motor drive unit controls the VCM at a compromise between the two conditions, as described above. For this reason, vibrations during driving cannot be sufficiently suppressed, and the floating posture of the magnetic head varies to degrade the reliability of the magnetic disk device.

SUMMARY OF THE INVENTION

It is an object of the present invention to provide a voice coil motor drive unit which quickly responds in a positioning operation, and can stabilize the floating posture of a magnetic head upon high-speed movement.

In order to achieve the above object, according to the present invention, there is provided a voice coil motor drive unit for a magnetic disk device, comprising a voice coil motor which has a coil and is driven in positioning and moving a magnetic head, drive means for supplying a driving current to the coil of the voice coil motor through a pair of power supply lines, and waveshaping means for shaping a waveform of the driving current supplied from the drive means to the voice coil motor into a waveform having a smooth leading edge, the waveshaping means having a capacitor connected between the power supply lines, and a pair of Zener diodes having the same Zener characteristics and identical poles connected to two poles of the capacitor to be opposite to each other, each of the Zener diodes having a Zener voltage which is set higher than a voltage applied to the coil in positioning the magnetic head, and lower than the voltage applied to the coil in moving the magnetic head.

BRIEF DESCRIPTION OF THE DRAWINGS

FIG. 3A is a voltage waveform chart of a VCM driver, and FIG. 3B is a current waveform chart of a VCM coil; and FIGS. 4A and 4B are circuit diagrams showing other examples of a waveshaping unit shown in FIG. 1.

DESCRIPTION OF THE PREFERRED EMBODIMENT

The present invention will be described in detail below with reference to the accompanying drawings.

Figure 1:
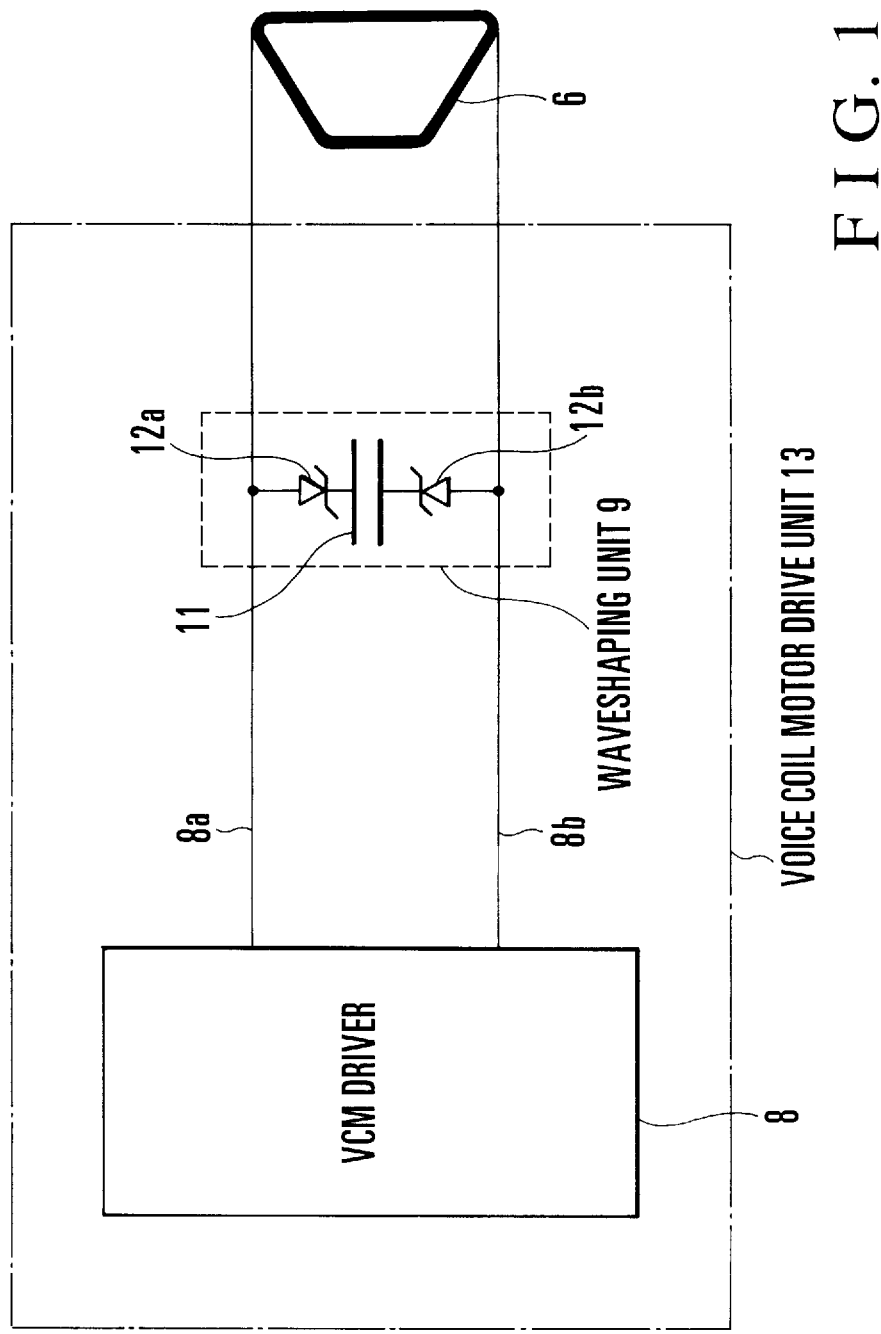
FIG. 1 is a circuit diagram showing a voice coil motor drive unit according to an embodiment of the present invention.
Figure 2:
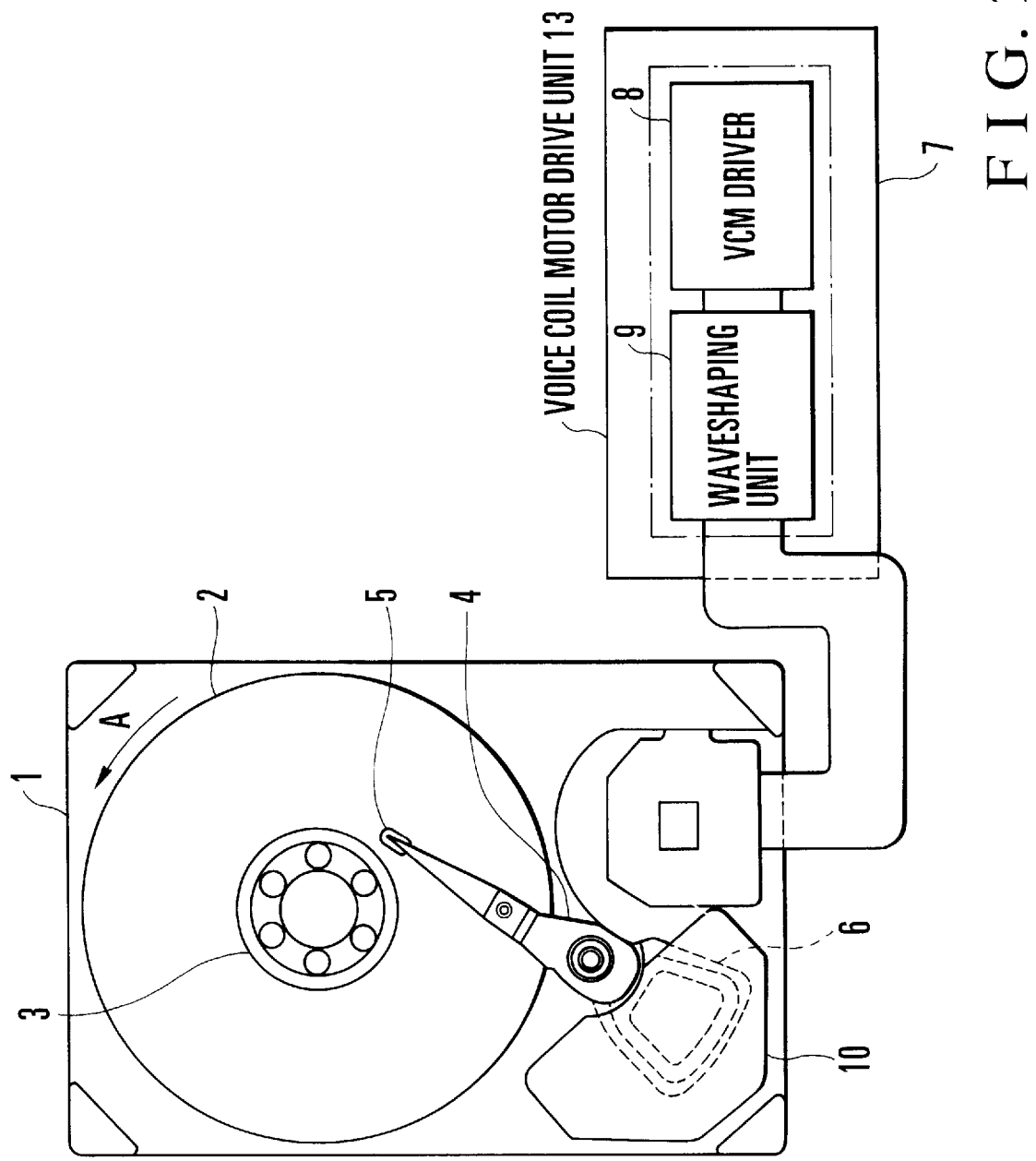
FIG. 2 is a plan view showing an example of a magnetic disk device to which the present invention is applied.

FIG. 2 shows a magnetic disk device to which the present invention is applied. Referring to FIG. 2, in a magnetic disk device 1, a magnetic disk 2 serving as an information recording medium is coupled to a spindle motor 3 to be rotated in the direction of an arrow A. A magnetic head 5 for recording and reproducing information on and from the magnetic disk 2 is carried at the distal end of a positioner 4, and driven by a voice coil motor (VCM) 10 to be positioned on a designated track of the magnetic disk 2. A VCM coil 6 as part of the VCM 10 is fixed to the proximal end of the positioner 4, which performs a positioning operation after the VCM coil 6 receives a driving current from a VCM driver 8. A waveshaping unit 9 is arranged between the VCM coil 6 and the VCM driver 8. The VCM driver 8 and the waveshaping unit 9 constitute a voice coil motor drive unit 13 and are mounted on a circuit board 7.

The voice coil motor drive unit 13 comprises the VCM driver 8 which supplies the driving current to the VCM coil 6 from a pair of output terminals through a pair of power supply lines 8a and 8b, and the waveshaping unit 9 connected to the power supply lines 8a and 8b between the VCM driver 8 and the VCM coil 6. The waveshaping unit 9 is constituted by a capacitor 11 and two Zener diodes 12a and 12b which have the same Zener characteristics and cathodes connected to the two poles of the capacitor 11 so as to be opposite to each other. The anodes of the Zener diodes 12a and 12b are respectively connected to the power supply lines 8a and 8b, i.e., the pair of output terminals of the VCM driver 8.

In this arrangement, when the output voltage of the VCM driver 8 is low, one of the Zener diodes 12a and 12b is rendered nonconductive, and the capacitor 11 is not electrically connected between the output terminals of the VCM driver 8. Accordingly, the current generated by the VCM driver 8 is entirely supplied to the VCM coil 6 to serve as the driving force of the positioner 4. When the output voltage from the VCM driver 8 becomes equal to or higher than a predetermined Zener voltage (barrier voltage) of the Zener diodes 12a and 12b, one of the Zener diodes 12a and 12b which has been rendered nonconductive is rendered conductive upon application of the high voltage, and the capacitor 11 is connected between the power supply lines 8a and 8b.

By using the Zener characteristics of the Zener diodes 12a and 12b, the output voltage from the VCM driver 8 is set lower than the barrier voltage when the magnetic head 5 is positioned, i.e., the magnetic head 5 is held above a specific track of the magnetic disk 2. In addition, the output voltage from the VCM driver 8 is set to exceed the barrier voltage when the magnetic head 5 is moved, i.e., the magnetic head 5 is moved from one track of the magnetic disk 2 to another track.

Next, the operation of the voice coil motor drive unit in which the barrier voltage of the Zener diodes 12a, 12b and the output voltage of the VCM driver 8 have the above-described relationship will be described with reference to FIGS. 3A and 3B.

In positioning the magnetic head 5 which must quickly respond, a voltage 21 applied to the VCM coil 6 is lower than a barrier voltage 20, as shown in FIG. 3A. One of the Zener diodes 12a and 12b serves as a barrier to stop the flow of a current to the capacitor 11. As a result, the waveshaping unit 9 becomes inactive (OFF). As shown in FIG. 3B, a current 23 generated by the VCM driver 8 is entirely supplied to the VCM coil 6 to obtain a high response speed.

On the other hand, in moving the magnetic head 5 which must be smoothly accelerated, a voltage 22 applied to the VCM coil 6 exceeds the barrier voltage 20, as shown in FIG. 3A. The Zener diodes 12a and 12b do not serve as a barrier, and the voltage is applied across the two terminals of the capacitor 11. As a result, a current flows through the capacitor 11, and AC components are accumulated as electrical charges in the capacitor 11 to operate (ON) the waveshaping unit 9. Accordingly, as shown in FIG. 3B, the current supplied to the VCM coil 6 has a waveform 24 which has a moderate leading edge and a round corner portion, while the AC components are removed by the waveshaping unit 9. The positioner 4 can be smoothly accelerated.

Vibrations generated in the positioner 4 during moving the magnetic head 5 generate noise and greatly influence the floating posture of the magnetic head 5. Since the magnetic head 5 normally floats by a floating amount on the order of submicron ($1/10,000$ mm) or smaller, even slight variations in floating posture of the magnetic head 5 greatly influence the floating margin of the magnetic head 5. Therefore, if the driving current in moving the magnetic head 5 has no high frequency component, the floating posture of the magnetic head 5 can be stabilized, resulting in high reliability of the magnetic disk device 1.

In the above-described embodiment, the cathodes of the Zener diodes 12a and 12b are respectively connected to the two poles of the capacitor 11. Even if the anodes of Zener diodes 112 and 113 are respectively connected to the two poles of a capacitor 111, as shown in FIG. 4A, the same operation and effect can be obtained.

If resistors 14 and 15 are respectively connected in series with the Zener diodes 12a and 12b to adjust the time constant and discharge electrical charges accumulated in the capacitor 11, as shown in FIG. 4B, a higher effect can be obtained. Note that the resistors 14 and 15 may be connected to the cathodes of the Zener diodes 12a and 12b.

As has been described above, in the voice coil motor drive unit for the magnetic disk device according to the present invention, in a positioning operation, the current generated by the VCM driver is entirely supplied to the VCM coil to obtain a high response speed, and in a moving operation, AC components are removed from a voltage applied to the VCM coil to attain a driving current whose waveform has a moderate leading edge. For this reason, the response characteristics in the positioning operation can be improved, and the floating posture of the magnetic head can be stabilized, resulting in high reliability of the magnetic disk device.

What is claimed is:

1. A voice coil motor drive unit for a magnetic disk device, comprising:

a voice coil motor which has a coil and is driven in positioning and moving a magnetic head;

drive means for supplying a driving current to said coil of said voice coil motor through a pair of power supply lines; and waveshaping means for shaping a waveform of the driving current supplied from said drive means to said voice coil motor into a waveform having a smooth leading edge, said waveshaping means having
        a capacitor connected between the power supply lines, and
        a pair of Zener diodes having the same Zener characteristics and identical poles connected to two poles of said capacitor to be opposite to each other, each of said Zener diodes having a Zener voltage which is set higher than a voltage applied to said coil in positioning said magnetic head, and lower than the voltage applied to said coil in moving said magnetic head.

2. A unit according to claim 1, further comprising resistors connected in series with said Zener diodes.

3. A unit according to claim 1, wherein respective cathodes of said Zener diodes are connected to the two poles of said capacitor.

4. A unit according to claim 1, wherein respective anodes of said Zener diodes are connected to the two poles of said capacitor.

5. A unit according to claim 1, wherein, in moving said magnetic head, a voltage higher than the Zener voltage is applied to turn on said Zener diodes and operate said waveshaping means.

* * * * *